Patented Apr. 3, 1951

2,547,689

UNITED STATES PATENT OFFICE 2,547,689

MANUFACTURE OF TRICHLOROMETHYL DISUBSTITUTED METHANES

Oliver W. Cass, Niagara Falls, N. Y., assignor to E. I. du Pont de Nemours & Company, Wilmington, Del., a corporation of Delaware No Drawing. Application October 19, 1945, Serial No. 623,433

12 Claims. (Cl. 260—613)

This invention relates to the manufacture of condensation products of chloral, particularly those of the trichloromethyl di-substituted methane type, and is still more particularly directed to the manufacture of 2,2-bis(para-chlorophenyl)-1,1,1-trichloroethane, more commonly known as DDT, by methods characterized by the condensation of chloral intermediate with monochlorobenzene in the presence of sulfuric acid of dehydrating strength.

It is known that chloral will condense in the presence of sulfuric acid with various compounds having replaceable hydrogen to give a variety of products of the di-substituted trichloromethyl type (Ber. 5, 1098; Ber. 7, 1181; U. S. 1,707,181, and U. S. 2,329,074). The monohalobenzenes are among the compounds which may be condensed with chloral in the presence of sulfuric acid. Using monochlorobenzene as the condensable compound, the product obtained employing suitable reaction conditions is DDT. The manufacture of this compound has now become of considerable importance in view of its outstanding insecticidal properties.

When ethanol is chlorinated as the first step in the manufacture of chloral for use in the processes heretofore available for the production of trichloromethyl di-substituted methanes, there is secured a crude mixture containing chloral hemiacetal, chloral hydrate, and compounds, which, if more highly chlorinated, would yield the above two compounds, along with such undesirable by-products as ethyl chloride, ethylidene chloride, and ethylene dichloride.

The process for producing chloral from the above crude chlorinated ethanol mixture is time consuming and expensive requiring treatment with sulfuric acid of dehydrating strength and distillation followed by careful rectification to eliminate undesirable by-products and underchlorinated products.

It is an object of this invention to provide improved processes for the manufacture of trichloromethyl di-substituted methanes. Another object of the invention is to provide processes which avoid difficulties attendant to the prior art manufacture. Further objects of the invention will appear as the description proceeds.

The objects of the invention are accomplished by the simple process of condensing chloral intermediate, that is, chlorinated ethanol which has been chlorinated sufficiently so that it would be suitable for conversion to chloral by the usual chloral process, with a suitable compound having a replaceable hydrogen in the presence of sulfuric acid of dehydrating strength, and more particularly by chlorinating ethanol in the presence of light to form chloral intermediate and thereafter converting the chloral intermediate without intervening treatment with sulfuric acid to a trichloromethyl di-substituted methane by condensation with a suitable compound having a replaceable hydrogen in the presence of sulfuric acid of dehydrating strength.

According to one embodiment of the present invention compounds which are condensable with chloral are condensed under the catalytic activation of sulfuric acid of dehydrating strength with chloral intermediate, either in the crude form or in the various states of refinement obtainable by suitable fractionation of the crude chloral intermediate. The constituents of chloral intermediate, which according to the methods of the prior art were first treated with sulfuric acid then rectified to yield chloral, are reacted directly with the chloral condensable to give the desired chloral condensate without processing the chloral intermediate to recover chloral or chloral hydrate.

The processes of the invention are particularly applicable to condensing aromatic compounds having replaceable nuclear hydrogen such as benzene, fluorobenzene, bromobenzene, iodobenzene, methoxybenzene, phenetol, phenol, toluene, metaxylene, ethyl benzene, naphthalene, tetrahydronaphthalene, and like homologues and derivatives of benzene, but more generally is applicable to other compounds having replaceable hydrogen as more generally set out in U. S. Patent 2,329,074.

In accordance with another embodiment of the invention, I chlorinate ethanol to chloral intermediate under the catalytic activation of light and then convert the product to a trichloromethyl di-substituted methane by condensation with a suitable compound having a replaceable hydrogen.

Chlorination under the catalytic activation of light produces a product free of such by-products as ethylene chloride, ethylene dichloride, and ethylidine chloride. This new and unexpected advantage as compared with chlorination in the absence of light or under catalytic activation of ferric chloride is directly reflected in the product and is particularly advantageous where the chloral intermediate is converted directly to trichloromethyl di-substituted methane without intervening treatment to convert it to chloral or chloral hydrate.

The chlorination of ethanol may conveniently be activated by white light, ultra-violet light, or light from a mercury arc lamp, a fluorescent lamp, or an ordinary incandescent lamp bulb. Suitable methods of chlorinating under the catalytic activation of light are set out in my copending applications Serial No. 527,012, filed March 17, 1944, now Patent No. 2,478,152, and Serial No. 566,015, filed November 30, 1944, now Patent No. 2,443,183.

The products obtained by the processes of this invention may be recrystallized from ethanol, monochlorobenzene, or other appropriate solvent to give products of any desired degree of purity. Operating in this manner, substantial economies are effected over the prior art processes both as to the simplicity of the processing steps and as to the simplicity of the apparatus required in the processing.

In carrying out the processes of my invention, ethanol is chlorinated with or without an activating catalyst such as light or ferric chloride to chloral intermediate, which is that product which on separate treatment with sulfuric acid of dehydrating strength followed by distillation and rectification would yield chloral. The product obtained consists principally of chloral hydrate and chloral hemiacetal. These compounds are largely contained in those fractions boiling between 92 and 101° C. and 112–120° C., respectively. It is sufficient according to the invention to chlorinate the ethanol and treat at least those fractions boiling within the above ranges with a chloral condensable compound in the presence of sulfuric acid of dehydrating strength. It is desirable, however, to continue the chlorination of ethanol until the product has a specific gravity of about 1.5 or more. In some cases, as will be pointed out, a more highly chlorinated product is of advantage in giving increased yields of trichloromethyl di-substituted methanes.

The invention may be more fully understood by reference to the following examples.

Example 1

Into a five-gallon Pfaudler vessel was charged 8816 grams of specially denatured 95% alcohol, known commercially as formula "2B," which type is denatured with benzene. The five-gallon vessel was equipped with a light well in which was placed a 200-watt incandescent light. The jacket of the vessel was equipped for circulation of either brine or hot water. An inlet tube for the introduction of chlorine was provided as well as a thermometer well and a connection for an efficient reflux condenser leading in turn to an absorption system for the absorption of hydrogen chloride and chlorine.

The alcohol was cooled to 3° C. The contents of the reactor was then illuminated and stirred while a slow stream of chlorine was introduced. In a three-hour period the temperature was allowed to rise to 30° C. while some seven pounds of chlorine was fed. After an additional four hours, the temperature was allowed to rise to 60° C. and after an additional five hours, to 82° C., after which the reaction temperature was maintained between 82° C. and 88° C. until the specific gravity of the contents of the reactor had reached 1.50. Thirty hours in all was required for this chlorination. During this period 32,600 grams of chlorine was fed to the reactor, of which 3704 grams passed through the reactor unreacted and was cooled in the scrubbing system. There remained in the reactor at the end of the chlorination 14,800 grams of liquid product. The material thus obtained is a crude chloral intermediate.

194 grams of the crude chloral intermediate produced above were mixed with 225 grams of monochlorobenzene in a reaction vessel cooled to 0° C. in an ice-water bath. 30% oleum was then added at a rate as fast as possible, still keeping the temperature below 10° C. In all, 530 grams of oleum were added over a period of one and three-quarters hours. The final temperature was 12° C. This was heated to 40° C. for three and one-half hours and then poured over cracked ice, washed with hot water and steamed. The crude wet product weighed 254 grams and when dried weighed 230 grams. The melting point was 66–67° C.

Example 2

A portion of the crude chloral intermediate of Example 1 was carefully fractionated through a packed column. The following fractions were collected:

| Distillation Temp., °C. | Weight, Per Cent |
|---|---|
| 92° | 2.5 |
| 92–96° | 20.5 |
| 96–98° | 27.0 |
| 98–112° | 13.2 |
| 112–116° | 22.4 |
| Over 116° | 11.3 |
| HCl | 1.1 |
| Loss | 2.0 |
| | 100.0 |

The fraction boiling at 92–98° C. contained a relatively large proportion of chloral hydrate while the fraction boiling at 112–116° C. contained a relatively large amount of chloral hemiacetal. The fractions from the above distillation show the typical distribution for fractionation of crude chlorination products from my preferred light activated chlorination of ethanol for producing chloral intermediate. The exact distribution of material between the various fractions will depend upon a number of factors such as the amount of water in the starting ethanol and the extent to which chlorination is carried out.

132 grams of fractions of the crude product from the above fractionation ranging in boiling point from 96–116° C. was reacted with 164 grams of monochlorobenzene and 360 grams of 30% oleum in accordance with the procedure of Example 1. Five and one-half hours were required for the reaction during which time the temperature rose from 5 to 38° C. 238 grams of wet product were obtained, which after drying at 50° C. for forty-eight hours had a melting point of 74–76° C.

Example 3

A process of the last paragraph of Example 1 was repeated using the following fractions and proportions of crude chloral intermediate from the distillation process of Example 2: 92–96° C. fraction, 22 grams; 97–101° C. fraction, 47 grams; 112–114° C. fraction, 12 grams; 114–115° C. fraction, 10 grams; 115–120° C. fraction, 41 grams. 500 grams of 15% oleum and 104 grams of monochlorobenzene were also used. The oleum was added over a period of one hour at a temperature of 25° C. It was further heated for two hours at 40° C. The material precipitated as fine, white powder. The wet product weighed 200 grams and the product had a melting point of 72–73° C.

Example 4

Into a 100-gallon glass lined reactor there was charged 60 gallons of 2-B denatured alcohol, specific gravity =0.816, and 15 gallons of a heel of chloral intermediate from a previous batch. A 200-watt tungsten filament lamp enclosed in a pyrex glass light well was immersed in the reaction liquid. Chlorine was introduced until the desired specific gravity was obtained. During the first half of the chlorination the temperature was maintained at 50° C. and then gradually increased to a maximum of 80° C.

Ethyl alcohol was chlorinated by the above method to chloral intermediate of various specific gravities of 1.516, 1.551, and 1.580 and each of the resulting products without intervening treatment condensed with monochlorobenzene as follows:

To a mixture of 211 grams of chloral intermediate and 270 grams of monochlorobenzene contained in a 2-liter, 3-necked, round bottom flask equipped with a dropping funnel, a thermometer, and an agitator, was added 400 grams of 98% sulfuric acid. The mixture was agitated for ½ hour while maintaining a temperature between 18 and 24° C. 685 grams of 104.5% sulfuric acid was then added at such a rate as to maintain the temperature between 18 and 24° C. The resulting heterogeneous mixture was vigorously agitated for 3 hours, during which time an additional 200 grams of monochlorobenzene was added to prevent the reaction mass from becoming too viscous. At the end of this 3-hour reaction period, the temperature was increased to 40° C. and the mixture allowed to settle for ½ hour. The acid layer was drawn off and the organic layer washed six times with an equal volume of water at 65° C. and the pH adjusted to about pH 9 by washing with dilute ammonium hydroxide. The washed product was next subjected to vacuum distillation followed by a period of air sparging to remove all remaining monochlorobenzene. The resulting product was poured into an evaporating dish and agitated until set.

The following table tabulates the results:

| Run | A | B | C |
|---|---|---|---|
| Sp. Gr. of Chloral Intermediate at 20° C | 1.516 | 1.551 | 1.580 |
| Grams of product | 339 | 364 | 372 |
| Grams product per 100 grams intermediate | 161 | 172 | 176 |
| Grams product per 100 grams monochlorobenzene | 95 | 99 | 100 |
| Set point of product, °C | 80.1 | 80.8 | 80.4 |

From these data it is evident that excellent conversions are obtained with specific gravities between about 1.5 and about 1.6 and that, other things being equal, increased yields are obtained without sacrifice of product quality with chloral intermediate chlorinated to specific gravities of about 1.55.

While I have described my invention with reference to particular embodiments, it will be understood that it is not limited thereto but that variation may be made without departing from the spirit and scope of the invention. Thus while I have described my invention particularly with reference to the condensation of chloral intermediate with monochlorobenzene, it will be understood that it is applicable to other compounds having replaceable hydrogen which form condensation products with chloral under the catalytic activation of sulfuric acid of dehydrating strength.

I claim:

1. In the manufacture of trichloromethyl disubstituted methane, the step comprising condensing chloral intermediate with a substituted benzene compound having replaceable hydrogen in the presence of sulfuric acid of dehydrating strength.

2. In the manufacture of 2,2-di-substituted-1,1,1-trichloroethane, the step comprising condensing chloral intermediate in the presence of sulfuric acid of dehydrating strength with a mono-substituted benzene selected from the class consisting of monochlorobenzene and methoxybenzene.

3. In the manufacture of 2,2-bis(methoxyphenyl)-1,1,1-trichloroethane, the step comprising condensing chloral intermediate with methoxybenzene in the presence of sulfuric acid of dehydrating strength.

4. In the manufacture of 2,2-bis(para-chlorophenyl)-1,1,1-trichloroethane, the steps comprising condensing chloral intermediate with monochlorobenzene in the presence of sulfuric acid of dehydrating strength.

5. In the manufacture of 2,2-bis(para-chlorophenyl)-1,1,1-trichloroethane, the steps comprising chlorinating ethanol to chloral intermediate and without intervening treatment to obtain chloral, condensing the chloral intermediate with monochlorobenzene in the presence of sulfuric acid of dehydrating strength.

6. In the manufacture of 2,2-bis(para-chlorophenyl)-1,1,1-trichloroethane, the steps comprising chlorinating ethanol under the catalytic activation of light to chloral intermediate and condensing the chloral intermediate with monochlorobenzene in the presence of sulfuric acid of dehydrating strength.

7. In the manufacture of 2,2-bis(para-chlorophenyl)-1,1,1-trichloroethane, the steps comprising chlorinating ethanol under the catalytic activation of light to chloral intermediate and without intervening treatment with sulfuric acid condensing the chloral intermediate with monochlorobenzene in the presence of sulfuric acid of dehydrating strength.

8. In the manufacture of 2,2-bis(para-chlorophenyl)-1,1,1-trichloroethane, the steps comprising chlorinating ethanol under the catalytic activation of light to a specific gravity of about 1.5-1.6 and condensing the resulting product with monochlorobenzene in the presence of sulfuric acid of dehydrating strength.

9. In the manufacture of 2,2-bis(para-chlorophenyl)-1,1,1-trichloroethane, the steps comprising chlorinating ethanol under the catalytic activation of light, distilling the product to separate fractions boiling below 92° C. and above 120° C. and condensing of the remainder at least those fractions boiling between 92° C. to 101° C. and 112° C. to 120° C. with monochlorobenzene in the presence of sulfuric acid of dehydrating strength.

10. In the manufacture of 2,2-bis(para-chlorophenyl)-1,1,1-trichloroethane, the steps comprising chlorinating ethanol as required to produce material containing fractions boiling in the ranges 92° C. to 101° C. and 112° C. to 120° C. and condensing at least the fractions having the above specified boiling points with monochlorobenzene in the presence of sulfuric acid of dehydrating strength.

11. A process for the production of dichlorodiphenyl-trichloroethane which comprises reacting chloral alcoholate, without previous treatment to obtain chloral, with monochlorobenzene in the presence of concentrated sulphuric acid.

12. A process for the production of dichlorodiphenyl-trichloroethane which comprises chlorinating ethyl alcohol to produce a chloral alcoholate product and reacting the resultant product with monochlorobenzene in the presence of concentrated sulphuric acid.

OLIVER W. CASS.

REFERENCES CITED

The following references are of record in the file of this patent:

UNITED STATES PATENTS

| Number | Name | Date |
|---|---|---|
| 774,151 | Besson | Nov. 8, 1940 |
| 2,329,074 | Muller | Sept. 7, 1943 |

OTHER REFERENCES

Groggins: "Unit Processes in Organic Syntheses," First edition, pages 192–4 (1935).

Wood et al.: "U. S. Dispensatory," 23rd edition, page 293.